Sept. 8, 1942. R. TAMPIER 2,295,306
AIRCRAFT
Filed July 26, 1939 4 Sheets-Sheet 1

INVENTOR
René Tampier
BY
ATTORNEY

Sept. 8, 1942.  R. TAMPIER  2,295,306
AIRCRAFT
Filed July 26, 1939    4 Sheets-Sheet 3

INVENTOR
René Tampier
BY
ATTORNEY

Sept. 8, 1942.　　　　　R. TAMPIER　　　　　2,295,306
AIRCRAFT
Filed July 26, 1939　　　　4 Sheets-Sheet 4
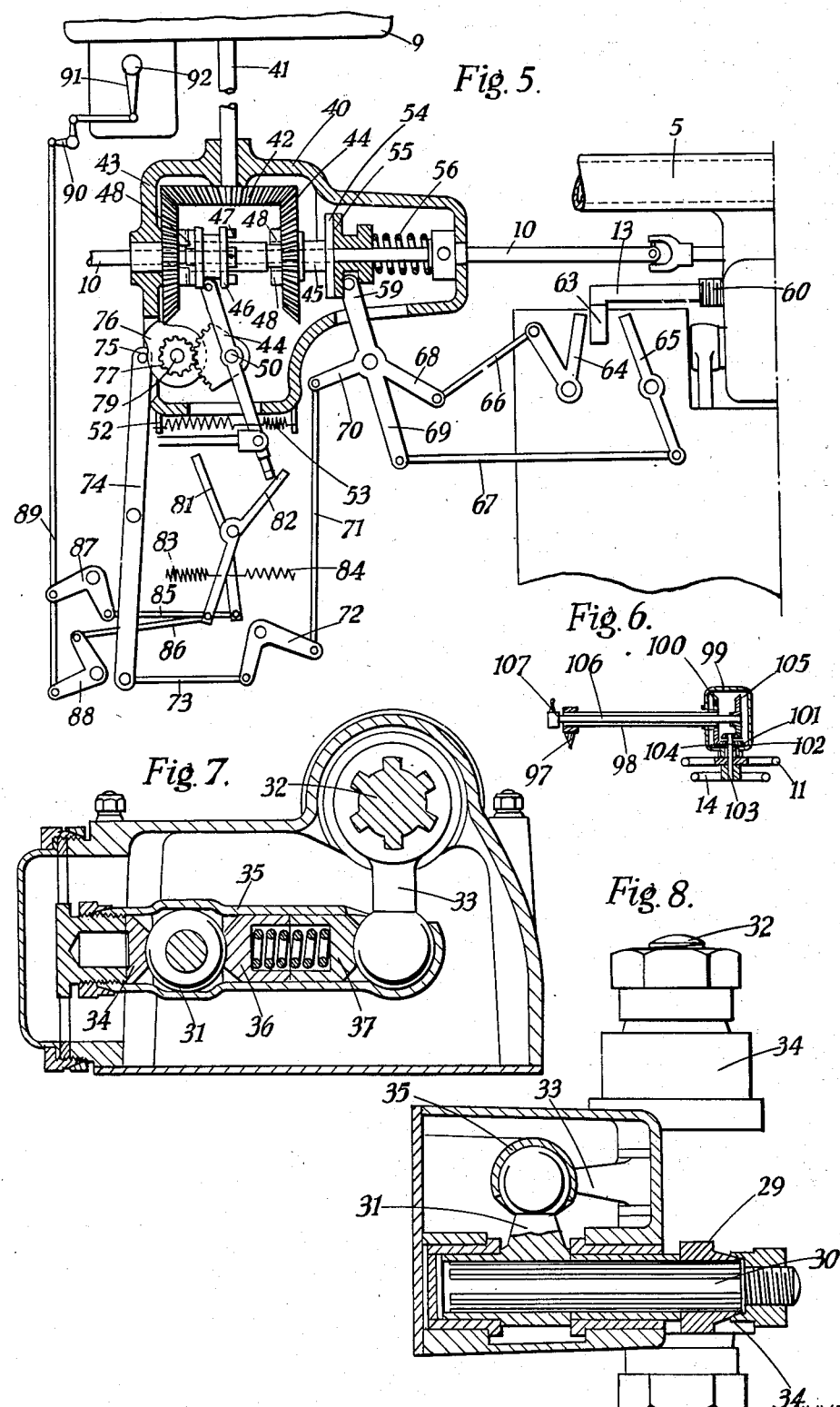

Patented Sept. 8, 1942

2,295,306

UNITED STATES PATENT OFFICE 2,295,306

AIRCRAFT

Rene Tampier, Cricklewood, London, England

Application July 26, 1939, Serial No. 286,667
In France August 3, 1938

11 Claims. (Cl. 244—75)

This invention relates to aircraft and in particular to means for operating movable surfaces of aircraft.

It has previously been proposed to operate a movable surface of an aircraft by power derived either from the aircraft engine or from a servomotor, the power operated elements including the usual cable or like transmission to the movable surface to be controlled.

The object of the present invention is to provide an improved means for the power operation of such movable surfaces (with or without manual operating means) permitting the use of a mechanically robust transmission such as a rotating shafting throughout between the power unit and the movable surface.

Another object of the invention is to provide means for automatically disconnecting the drive when the movable surface is moved into a limit position.

A further object of the present invention is to provide an alternative manually operated means for controlling such movable surfaces, the transmission from such manually operated means to the movable surface being quite separate from the transmission operated by the power operating means.

One way of carrying out the present invention is illustrated in the accompanying drawings wherein:

Figure 5 is a detail view, partly in section, illustrating the reversing gear of Figure 2 in an engaged position.

Figure 6 is a detail view in section of the arrangement of hand wheels controlling the mechanism, and Figures 7 and 8 are detail views in section, taken at right angles to each other, of a reversible hinge mechanism.

Figure 1:
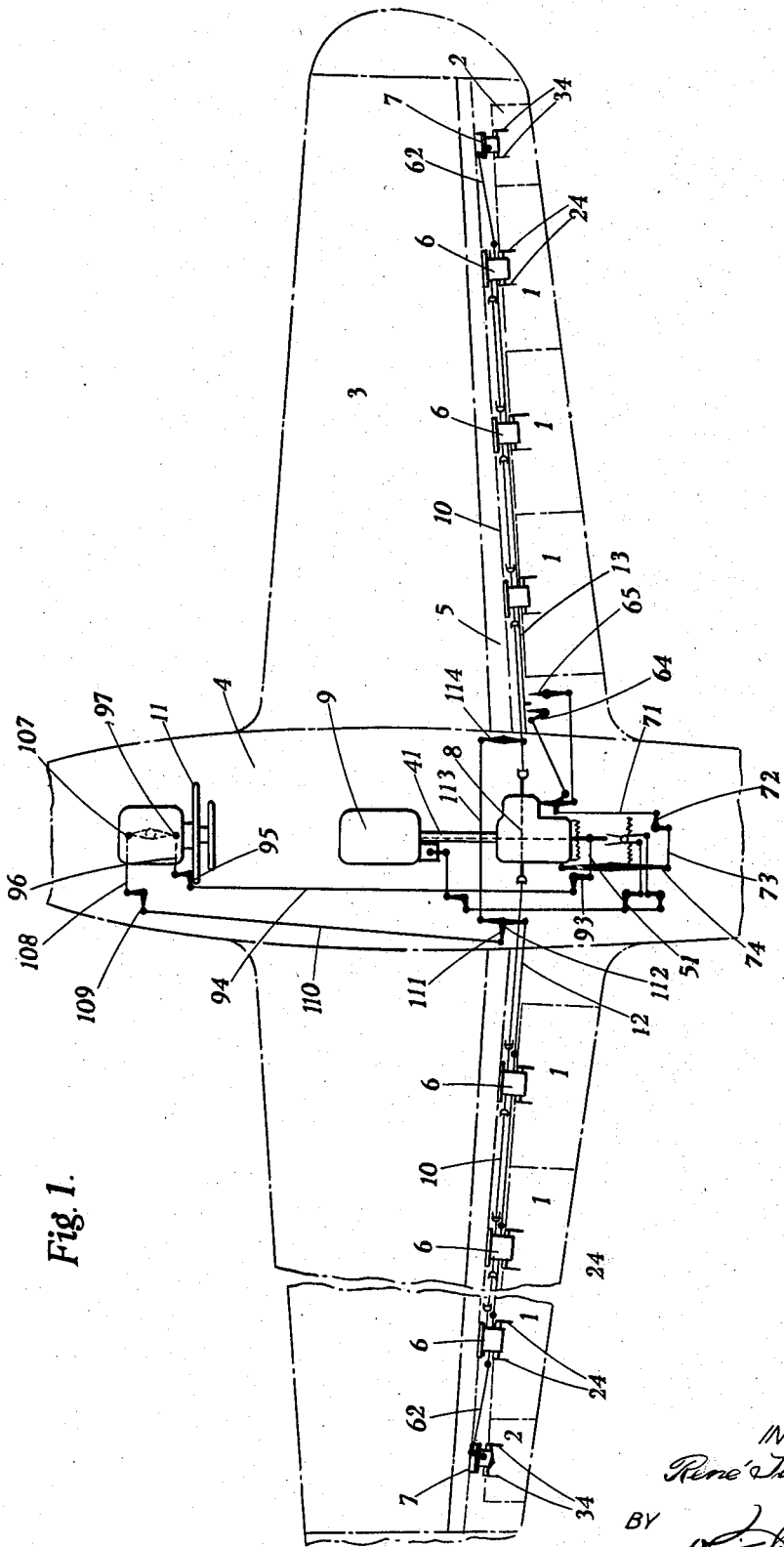
Figure 1 is a diagrammatic plan view of an aeroplane fitted with control mechanism according to the invention.

In Figure 1 the flaps 1, 1, 1 and 2 together make up an aileron carried at the rear of the wing 3 on each side of the fuselage 4. Each flap 1 is hingeably connected to a spar 5 extending across the wing structure by an irreversible hinge 6, and each flap 2 is connected to the spar 5 by a reversible hinge 7. The irreversible hinges are driven through a reversing gear 8 from a petrol engine 9 through a Cardan shaft 10, the operation being controlled from the cockpit by operating hand wheel 11. The Cardan shaft is preferably made in a number of sections jointed together to avoid abnormal friction and to enable it to follow freely deformations in the wing. Alternative hand driven operating means for the hinges comprise Cardan shafts 12, 13 controlled from a second hand wheel 14 in the cockpit of the machine. The hinges 6, being irreversible, remain in the positions in which they are placed by the drive. The hinges 7, being reversible, are sensitive to any air pressure variations and are operably connected as hereafter described, to the irreversible hinges so that the latter are moved in accordance with any movement of the hinges 7 as a result of such pressure variations. The flaps 2, 2 to which the reversible hinges 7 are connected, therefore act as detector surfaces for variations in air pressure.

Figure 3:
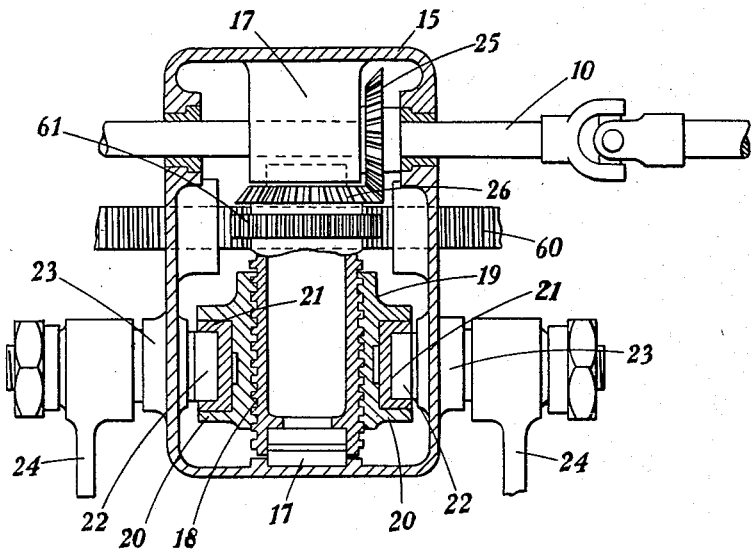
Figure 3 is a detail view in section of an irreversible hinge.

A suitable irreversible hinge construction for connecting the flaps 1 to the spar 5 is illustrated in Figure 3, and consists of a casing 15 adapted to be fixed to the spar 5. A shaft 16 rotatably mounted in bearings 17, 17 extends through the casing 15 and carries an exterior screw thread 18 on which a nut 19 is mounted for translation when the shaft 16 is rotated. On opposite sides of the nut are circular bearings 20 accommodating ring members 21 having rectilinear grooves in which the ends of crank arms 22, 22 are slidably mounted, the other ends of the crank arms being connected to spindles passing through bearings 23, 23 in the side walls of the casing 15. The spindles are connected to arms 24, 24 attached directly to a flap 1. The shaft 16 is adapted to be rotated from the Cardan shaft 10 through a reduction gear comprising a bevel pinion 25 on the Cardan shaft meshing with a bevel pinion 26 on the shaft 16.

Figure 4:
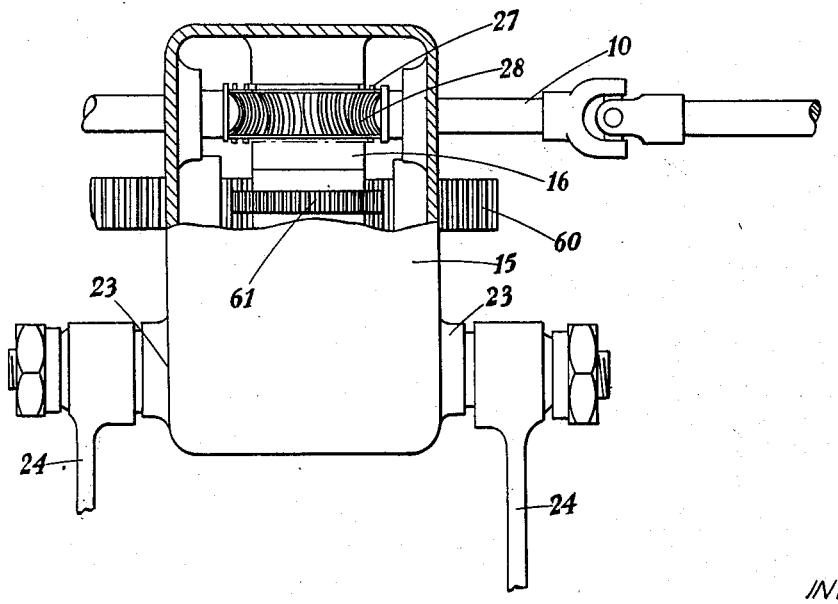
Figure 4 is a detail view partly in section illustrating a modification of the device shown in Figure 3.

In Figure 4, another kind of reduction gear is employed, namely a screw 27 on the Cardan shaft 10 in mesh with a tangent wheel 28 fixed to the shaft 16.

The essential features of construction of the reversible hinges 7, known per se are illustrated in Figures 7 and 8. Briefly, the hinge comprises an operating lever 29, adapted when actuated, to rotate a shaft 30 provided at its inner end with a ball-ended crank arm 31, and a second shaft 32 disposed at right angles to the shaft 30, and also provided with a ball-ended crank arm 33. The shaft 32 constitutes the hinge pin and is provided near its ends with two arms 34 adapted to be connected to a flap 2. The ball ends of the crank arms 31, 33 are connected together by a member 35 which contains two socket members 36, 37 in the form of spring loaded plungers which maintain one of the ball ends pressed against a socket member 34 at the other end, the latter socket member being adjustably mounted in the member 35 to vary the pressure of the plungers on the ball ends. Rotation of the shaft 30 thus produces a corresponding rotation of the shaft 32.

Figure 2:
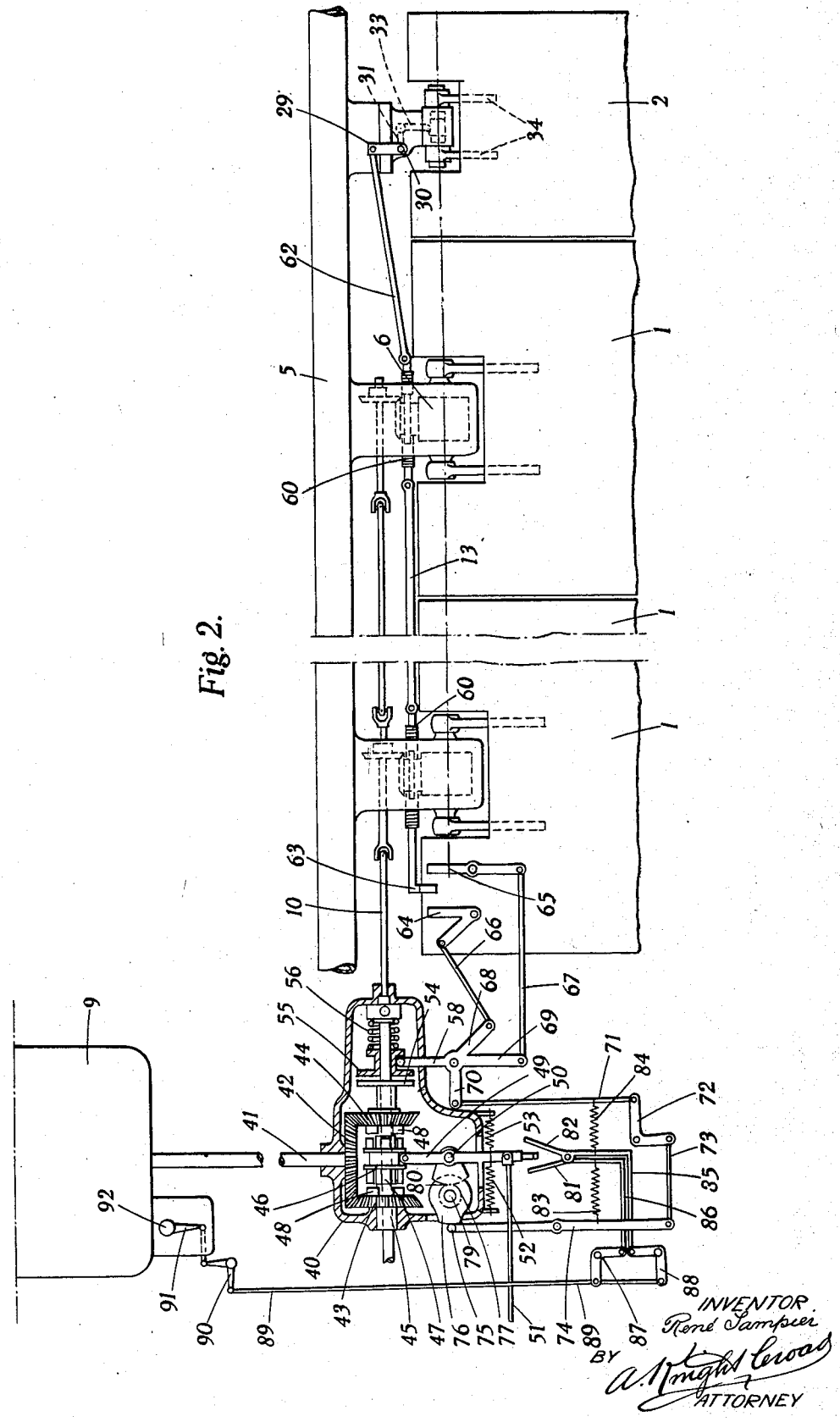
Figure 2 is a schematic plan view showing part of the control mechanism in detail.

The reversing gear 8 is operatively disposed between the engine 9 and the Cardan shaft 10 and is illustrated in detail in Figure 2 (neutral position) and Figure 5 which shows the gear in one of the two engaged positions. As shown in these figures it consists of a casing 40 through one end of which passes the engine shaft 41. A bevel pinion 42 keyed on to the end of the shaft 41 inside the casing 40 is in mesh with two bevel pinions 43, 44 mounted loosely on a hollow shaft 45 mounted in the casing 40 at right angles to the shaft 41 and surrounding the Cardan shaft 10, which passes through the shaft 45. A clutch member 46, keyed or otherwise fixed to the shaft 45 so as to be slidable thereon and rotatable therewith is provided on both sides with teeth 47 adapted to mesh respectively with corresponding teeth 48 carried on, and solid with each of the pinions 43, 44. The clutch member 46 has a grooved sleeve engaged by a clutch fork 49 rotatably mounted at 50 and operatively connected at its other end to a rod 51. The clutch member is acted on by two springs 52, 53 which act in opposite directions tending to keep the clutch member in the neutral position shown in Figure 2, in which position the shaft 45 cannot be driven by the motor. A friction clutch comprising plates 54, 55 is operatively disposed between the shaft 45 and the Cardan shaft 10, the plate 54 being rigidly fixed to the shaft 45 and the plate 55 being slidably mounted on a channelled part of the shaft 10. A spring 56 acts on the plate 55 and tends to press the two plates together. The plate 55 has a peripheral groove engaged by an operating fork 58.

The Cardan shafts 12, 13 are formed at intervals corresponding to the distances between the irreversible hinges with racks 60, each of which is engaged by a pinion 61 fixed to rotate with the shaft 16 of a hinge 6. The outer ends of the Cardan shafts 12, 13 are connected respectively by links 62 to the members 29 operating the reversible hinges 2. The inner ends of the Cardan shafts are formed with stops 63 adapted to co-operate with two pivoted levers 64, 65, connected respectively by links 66, 67 to arms 68, 69 formed integral with the clutch fork 58. The clutch fork 58 is provided with a further arm 70 connected through link 71, pivoted bell crank lever 72 and link 73 to one end of a pivoted lever 74, the other end of which carries a roller 75 adapted to ride over a cam 76 fixed, together with a pinion 77, on a shaft 79. The pinion 77, shaft 79 and cam 76 are adapted to be rotated by a gear segment 80 fixed to the pin 50 on which the fork 49 for the reversing gear is mounted.

The lower end of the fork 49 is adapted to co-operate with a pair of spring-pressed pivoted levers 81, 82, the actuating springs 83, 84 of which tend to keep the levers in the positions shown in Figure 2. The lower ends of these pivoted levers are connected respectively through rods 85, 86 pivoted bell crank levers 87, 88, link 89, pivoted bell crank levers 90 and 91, to the throttle spindle 92 of the carburettor of the engine (Figures 2 and 5).

Referring again to Figure 1 and to Figure 6, the rod 51 actuating the clutch fork 49, is connected through bell crank lever 93, rod 94, bell crank lever 95, rod 96, and bell crank lever 97, to a tubular shaft 98, terminating inside a casing 99 and having a bevel pinion 100 fixed thereon. The pinion 100 is engaged by a second bevel pinion 101 mounted on one end of a hollow shaft 102, on the other end of which is mounted the hand operating wheel 11.

The second hand wheel 14 is fixed to a shaft 103 extending through the hollow shaft 102 and carrying a bevel wheel 104 engaging a bevel wheel 105 fixed on the end of a shaft 106 extending through the hollow shaft 98. The shaft 106 is operatively connected to the two Cardan shafts 12, 13 by pivoted bell crank lever 107, rod 108, pivoted bell crank lever 109, rod 110, lever 111, pivoted lever 112 (one end of which is directly connected to the Cardan shaft 12), rod 113, and pivoted lever 114 (connected to the Cardan shaft 13).

The apparatus described operates in the following way:

When it is desired to rock the aileron flaps 1, 2 by the engine power, the hand wheel 11, is rotated to engage the teeth on the clutch member 46 either with the teeth on the bevel wheel 43 or the teeth on the bevel wheel 44 according to the direction in which the ailerons are to be rocked. The movement of the clutch fork 49 either in one direction or the other causes the lower end thereof to act against one of the pivoted levers 81 or 82 which operates the transmission system 81, 85, 87, or 82, 86, 88, and 89—92 to act on the throttle of the carburettor to modify the speed of the engine progressively with the engagement of the clutch teeth.

The arrangement is such that when the lever is in the neutral position shown in Figures 1 and 2, the control on the throttle is closed to a maximum extent so that the engine shaft has a minimum speed. When the clutch fork 49 is moved to the right or left the throttle is automatically adjusted to provide a progressively increasing speed of the engine shaft, until, when the clutch has been displaced to a maximum, a maximum speed is obtained. In this way no sudden shocks are applied to fast moving members of substantial dimensions and damage to the mechanism is consequently avoided. This automatic speed regulation can be made as sensitive as required, by making the teeth of the reversing gear sufficiently long.

Movement of the clutch fork 49 to place the clutch 46 in an engaged position (as shown in Figure 5) causes the toothed sector 80 to rotate the pinion 77 and cam 76 into the position shown in Figure 5, in which position the restraining effect of the clutch fork 58 on the clutch plate 55 is removed, and this plate is pressed into engagement with the clutch plate 54 under the action of the spring 56. The Cardan shaft 10 is now driven by the engine 9 through engine shaft 41, reversing gear 8, shaft 45 and friction clutch 55, 56, and the ailerons are rocked into the desired positions, the irreversible hinges 6 being driven from the shaft 10 through the reduction gearing described.

The reduction obtained by the reduction gearing 25, 26 or 27, 28 is additional to the reduction obtained by the screw 18 and nut 19, and permits several tens of revolutions of the Cardan shaft for rocking the aileron surfaces 40° or 50° upwardly or downwardly from the mean position. The torsion forces on the Cardan shaft are thereby considerably reduced, which permits of a light shaft of small diameter to be employed.

The pinions 61 on the shafts of the irreversible hinges are simultaneously driven, and cause longitudinal displacement of the racks 60. This longitudinal displacement of the racks 60 produces a corresponding displacement of the links 62 which rock the operating members 29 of the reversible hinges 6, so that the end aileron flaps 2 are also operated simultaneously with the flaps 1.

The stop 63 carried on the shaft 13 is also displaced. This stop is so arranged relatively to the levers 64, 65 that when the ailerons have been rocked to a desired maximum extent the stop butts against one of the levers 64, 65, and causes the clutch fork 58 to move the plate 55 of the friction clutch against its spring to disengage the clutch and consequently to disengage the engine drive from the Cardan shaft 10.

The provision of the cam 76 ensures that the friction clutch 46 cannot be engaged until the friction clutch 54, 55 has been disengaged. When the clutch fork 49 is in the position shown in Figure 2, the cam maintains the lever 74 in a position in which the plates 54, 55 cannot be engaged by the fork 58. When the clutch 46 is moved into an engaged position, as shown in Figure 5, the restraint of the cam 76 on the lever 74 is removed and the lever 74 is free to move against an inclined surface of the cam, thereby allowing the clutch fork 58 to move under the action of the spring 56. When the stop 63 operates one of the levers 64, 65 the lever 74 is returned into the position shown in Figure 2, but the roller 75 no longer rests on the cam surface since the cam has not changed its position. The clutch plates 54, 55 however, remain disengaged under the action of the stop 63 and lever 64, 65 on the clutch fork 58.

In case of failure of the engine, the pilot can control the aileron surfaces by operating the hand wheel 14 which operates directly the Cardan shafts 12, 13 through the transmission above described.

At all times the end flaps 2, being connected to the spar 5 by reversible hinges, are free to be operated by aero-dynamic thrusts, the movement of the surface 2 being imparted to the surfaces 1 through the racks 60.

It is to be understood that any form of reversible or irreversible hinges may be employed instead of those described. Moreover, the clutch, reversing gear and change speed device may be constructed differently. For example, the reversing device illustrated may be replaced by an electric motor in which the current may be changed in direction, or interrupted, by means of a switch controlled by the pilot, if necessary with the addition of an interrupter operating automatically to break the circuit when the surfaces to be controlled reach the ends of the angular travel provided for. Again, this device may be replaced by a fluid control under pressure provided with a distributor operated by the pilot and obturating elements operating automatically, and so forth.

The friction clutch 54, 55 may also be replaced by a progressive clutch controlled electrically, hydraulically, or pneumatically, the rotation couples being transmitted by means of plates, cones, drums or other suitable members.

The variation at the will of the pilot in the speed of rotation of the surfaces 1, 2 may also be effected by means other than those illustrated in the drawings, which are only by way of example. For example, if an electric motor is employed, a rheostat may be used. If the transmission is hydraulic or pneumatic the supply of fluid may be varied by changing the travel of the pump pistons or by varying the opening of a by-pass, and so forth.

The operating members and transmission systems illustrated schematically on the accompanying drawings, could obviously vary according to the way in which the pilot's station is fitted. The clutch fork 49 for example, or a rack engaging with a toothed wheel which may be substituted for this fork, might be controlled by the pilot by means of his control column, or by means of the rudder bar controlling the rudder of an aeroplane. Further, the safety devices provided for disconnecting the drive to the shaft 10 when the surfaces 1, 2 reach the end of their movement could be made in any other convenient manner; for example by means of a sliding nut mounted for displacement on a screw rigid with the shaft and acting on the clutch 54, 54 whenever it is brought into a limit position, in either direction, by rotation of this shaft. In all cases, it will be sufficient to provide a device permitting the pilot to engage the control again, at will, even when the safety device is tending to keep the clutch in the disengaged position.

Finally, these devices may be employed separately in numerous cases where the mechanism for varying the speed of displacement of the surfaces is not utilised; this applies also when a surface having a reversible control connected to a surface having an irreversible control, is not employed. The device according to the invention is obviously equally applicable to control surfaces of aircraft other than ailerons.

What I claim is:

1. In an aircraft, a wing, a movable control surface, a Cardan shaft extending along the wing of the aircraft, a controllable hinge connecting said control surface to the wing, power means for rotating the Cardan shaft, and hinge actuating mechanism operatively disposed between the Cardan shaft and the controllable hinge and directly connected to the said hinge, whereby rotation of the Cardan shaft actuates said controllable hinge to operate the flap connected thereby to the wing.

2. In an aircraft, a wing, a movable control surface, a Cardan shaft extending along the wing of the aircraft, a controllable hinge connecting said control surface to the wing, power means for rotating the Cardan shaft, and hinge actuating mechanism comprising reduction gearing operatively disposed between the Cardan shaft and the controllable hinge and directly connected to the said hinge, whereby rotation of the Cardan shaft actuates said controllable hinge to operate the flap connected thereby to the wing.

3. In an aircraft, a wing, a movable control surface comprising a plurality of flaps, a Cardan shaft extending along the wing of the aircraft, a controllable hinge connecting each of said flaps to the wing, power means for rotating the Cardan shaft, and hinge actuating mechanism operatively disposed between the Cardan shaft and each of the controllable hinges and directly connected to said hinges, whereby rotation of the Cardan shaft actuates each of said controllable hinges to operate the flap connected thereby to the wing.

4. In an aircraft, a wing, a movable control surface, a Cardan shaft extending along the wing of the aircraft, power means for rotating said Cardan shaft, a reversing gear operatively disposed between said power means and said Cardan shaft, a limit-controlled clutch operatively disposed between said reversing gear and said Cardan shaft, a controllable hinge connecting said control surface to the wing, and hinge actuating mechanism operatively disposed between the Cardan shaft and the controllable hinge and directly connected to said hinge, whereby rotation of the Cardan shaft actuates said controllable hinge to operate the flap connected thereby to the wing.

5. In an aircraft, a wing, a movable control surface comprising a plurality of flaps, a Cardan shaft extending along the wing of the aircraft, power means for rotating said Cardan shaft, a reversing gear operatively disposed between said power means and said Cardan shaft, a limit-controlled clutch operatively disposed between said reversing gear and said Cardan shaft, a controllable hinge connecting each of said flaps to the wing, and hinge actuating mechanism operatively disposed between the Cardan shaft and each of the controllable hinges and directly connected to said hinges, whereby rotation of the Cardan shaft actuates each of said controllable hinges to operate the flap connected thereby to the wing.

6. In an aircraft, a wing, a movable control surface, a Cardan shaft extending along the wing of the aircraft, power means for rotating said Cardan shaft, a reversing gear operatively disposed between said power means and said Cardan shaft, a clutch incorporated in said reversing gear, a limit-controlled clutch operatively disposed between said reversing gear and said Cardan shaft, a controllable hinge connecting said control surface to the wing, hinge actuating mechanism operatively disposed between the Cardan shaft and the controllable hinges and directly connected to said hinge, whereby rotation of the Cardan shaft actuates said controllable hinge to operate the flap connected thereby to the wing, and means for ensuring disengagement of the limit-controlled clutch prior to operating the clutch incorporated in the reversing gear.

7. In an aircraft, an engine, a movable control surface, means for controlling the movable surface, said means comprising a controllable hinge connecting the movable surface and a fixed part of the aircraft, means for actuating the controllable hinge connection from a suitable power source comprising a transmission including a reversing gear, a clutch incorporated in said reversing gear, a shaft driven from the reversing gear and operatively connected to the controllable hinge, a device controlling the speed of the engine, and means comprising a mechanical linkage operatively connected to the throttle of the aircraft engine and adapted to be actuated when the clutch is moved for automatically operating the said device when the clutch is operated.

8. In an aircraft, a movable control surface comprising a plurality of flaps, a controllable hinge connection between each of said flaps and a fixed part of the aircraft, some of said controllable hinge connections being irreversible but at least one being reversible, a Cardan shaft extending along the wing of the aircraft and operatively connected to said irreversible hinge connections, a mechanical linkage interconnecting the operating mechanism of the reversible hinge and that of the irreversible hinges, and power means for driving the Cardan shaft to actuate said controllable hinge connections and control the movable surface.

9. In an aircraft a movable control surface comprising a plurality of flaps, a controllable hinge connection between each of said flaps and a fixed part of the aircraft, some of said controllable hinge connections being irreversible but at least one being reversible, two Cardan shafts extending along the wing of the aircraft, each of which is operatively connected to said irreversible hinge connections, a mechanical linkage interconnecting the operating mechanism of the reversible hinge and that of the irreversible hinges, power means for driving one of said Cardan shafts to actuate said controllable hinge connections and control the movable surface, and manually operated means for driving the second of said Cardan shafts to actuate said controllable hinge connections and control the movable surface, said manually operated means being operable alternatively to the said power means.

10. In an aircraft, a movable control surface comprising a plurality of flaps, a controllable hinge connection between each of said flaps and a fixed part of the aircraft, some of said controllable hinge connections being irreversible but at least one being reversible, two Cardan shafts extending along the wing of the aircraft, each of which is operatively connected to said irreversible hinge connections, a mechanical linkage interconnecting the operating mechanism of the reversible hinge and that of the irreversible hinges, power means for driving one of said Cardan shafts to actuate said controllable hinge connections and control the movable surface, manually operated means for driving the second of said Cardan shafts to actuate said controllable hinge connections and control the movable surface, said manually operated means being operable alternatively to the said power means, a control element located in the cockpit for controlling the operation of the power means, and a control element located in the cockpit for controlling the manually operated means, said control elements having a common axis.

11. In an aircraft, a wing, a movable control surface comprising a plurality of flaps, a Cardan shaft extending along the wing of the aircraft, power means for rotating said Cardan shaft, a reversing gear operatively disposed between said power means and said Cardan shaft, a clutch incorporated in said reversing gear, a limit-controlled clutch operatively disposed between said reversing gear and said Cardan shaft, a controllable hinge connecting each of said flaps to the wing, and hinge actuating mechanism operatively disposed between the Cardan shaft and each of the controllable hinges and directly connected to said hinges, whereby rotation of the Cardan shaft actuates each of said controllable hinges to operate the flap connected thereby to the wing, and means for ensuring disengagement of the limit-controlled clutch prior to operating the clutch incorporated in the reversing gear.

RENÉ TAMPIER.